US008601583B1

(12) United States Patent
Chandrasekhar et al.

(10) Patent No.: US 8,601,583 B1
(45) Date of Patent: Dec. 3, 2013

(54) CERTIFICATION OF VIRTUAL MACHINE IMAGES IN CLOUD COMPUTING ENVIRONMENTS

(75) Inventors: Bharath Kumar Chandrasekhar, Sunnyvale, CA (US); Narasimham Kodukula, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 231 days.

(21) Appl. No.: 13/087,186

(22) Filed: Apr. 14, 2011

(51) Int. Cl.
*G06F 21/00* (2013.01)

(52) U.S. Cl.
USPC .......................................................... 726/24

(58) Field of Classification Search
USPC ..................................................... 726/22–24
See application file for complete search history.

(56) References Cited

U.S. PATENT DOCUMENTS

| 5,623,600 | A | 4/1997 | Ji et al. | |
|---|---|---|---|---|
| 6,092,194 | A | 7/2000 | Touboul | |
| 6,195,587 | B1 | 2/2001 | Hruska et al. | |
| 6,938,097 | B1 | 8/2005 | Vincent et al. | |
| 7,010,807 | B1 * | 3/2006 | Yanovsky | 726/24 |
| 2006/0101282 | A1 * | 5/2006 | Costea et al. | 713/188 |
| 2009/0089860 | A1 * | 4/2009 | Forrester et al. | 726/3 |
| 2010/0017512 | A1 * | 1/2010 | Ciano et al. | 709/225 |
| 2011/0126197 | A1 * | 5/2011 | Larsen et al. | 718/1 |

OTHER PUBLICATIONS

"Trend Micro Delivers First Agentless Anti-Malware for VMware-Virtualized Datacenters", Aug. 31, 2010, PR Newswire, http://www.prnewswire.com/news-releases/trend-micro-delivers-first-agent-less-anti-malware-for-vmware-virtualized-datacenters-101879808.html.*
"VMware vShield Endpoint: Endpoint Security for Virtual Datacenters", VMware, 2010.*
"The Virtualization Practice: A Look at Trend Micro Deep Security 7.5", Edward L. Haletky, 2011.*
Deep Security—Enterprise Virtualization Security, 2 pages [retrieved on Mar. 2, 2011], retrieved from the internet: http://us.trendmicro.com/us/products/enterprise/datacenter-security/deep-security/index.html.
Dave Asprey "Who Owns Security in the Cloud?", a Trend Micro Opinion Piece, Feb. 2011, 8 pages.
Eva Chen "A Brave New (Security) World", How Security is Changing to Support Virtualization and Cloud Computing, a Trend Micro White Paper, Jan. 2011, 13 pages.
Amazon Machine Image—Wikipedia, the free encyclopedia, 2 pages [retrieved on Feb. 23, 2011], retrieved from the internet: http://en.wikipedia.org/wiki/Amazon_Machine_image.
Creating an Image, 3 pages [retrieved on Mar. 25, 2011], retrieved from the internet: http://docs.amazonwebservices.com/AmazonEC2/gsg/2006-06-26/creating-an-image.html.

* cited by examiner

*Primary Examiner* — Joseph P. Hirl
*Assistant Examiner* — John B King
(74) *Attorney, Agent, or Firm* — Okamoto & Benedicto LLP

(57) ABSTRACT

Virtual machine images in a cloud computing environment may be certified using a validator machine image. The validator machine image is configured to boot a validator virtual machine, which boots a virtual machine off a virtual machine image from among virtual machine images available in the catalog of the cloud computing environment. The validator virtual machine may scan the virtual machine for malware, including computer viruses. A virtual machine image from among the virtual machine images may be packaged to include a certifier agent that verifies the virtual machine image upon execution. Reputation of virtual machine images may be stored in a virtual machine image reputation database and made available by way of a portal.

15 Claims, 8 Drawing Sheets

CERTIFICATION OF VIRTUAL MACHINE IMAGES IN CLOUD COMPUTING ENVIRONMENTS

BACKGROUND OF THE INVENTION

1. Field of the Invention

The present invention relates generally to computer security, and more particularly but not exclusively to security of cloud computing environments.

2. Description of the Background Art

Virtual machines, in general, are well known in the art of computer science. Generally speaking, a virtual machine is a software implementation of a machine (i.e., a computer) that executes programs like a physical machine. Multiple virtual machines may run on a single computer hardware platform, which is also referred to as "host machine." Although the virtual machines run in the same host machine, each virtual machine has its own operating system and application programs, and functions as a computing environment separate from the host machine and the other virtual machines.

Cloud computing refers to services, storage, processing, and other computing tasks performed over a computer network using distant server computers. Cloud computing provides computational resources to an end-user without the end-user setting up his own computing infrastructure. Examples of public cloud service providers include Amazon Web Services™, Rackspace™, and GoGrid™. OpenStack™ is an example open software initiative for building public and private cloud computing environments.

Public cloud computing allows for utility-model pricing. That is, the user typically pays only for what he uses. To facilitate setup and use of a cloud computing service, cloud service providers either offer pre-built virtual machine images themselves or offer a marketplace where a third party can sell or give pre-built virtual machine images to users. A virtual machine image comprises a data file that stores all information, including operating system, application programs, etc., required to startup one or more simultaneous and active virtual machines. The licensing aspects of using virtual machine images (e.g., those with Microsoft Windows™ software) may be built into the pricing of the virtual machine images, and some cloud service providers have worked out agreements with some software vendors.

A virtual machine image, which also referred to as simply as "machine image", may include an operating system and other software for providing services in the cloud computing environment. A problem for customers when taking advantage of pre-built virtual machine images has to do with trust. That is, the customer does not know whether or not the virtual machine images are free of malware, such as computer viruses, Trojans, spyware, and other malicious codes. To make matters worse, malware writers may perform actions to artificially increase the reputation of a virus-infected virtual machine image to make the machine image more attractive to end-users.

SUMMARY

In one embodiment, a method of certifying a virtual machine image in a cloud computing environment includes installing an anti-malware in a virtual machine. The anti-malware is used to scan the virtual machine for presence of malware. In response to finding that the virtual machine image is free of malware, the anti-malware is removed from the virtual machine and an original fingerprint is generated and stored in the virtual machine. The virtual machine is saved as a virtual machine image after removing the anti-malware from the virtual machine and storing the original fingerprint in the virtual machine. The virtual machine image is listed in a catalog of a public cloud computing environment.

In another embodiment, a method of certifying a virtual machine image in a cloud computing environment includes booting a validator virtual machine from a validator virtual machine image. The validator virtual machine boots a target virtual machine from a target virtual machine image. The validator virtual machine injects a security module into the target virtual machine. The security module scans the target virtual machine for malware. The security module is removed from the target virtual machine after scanning the target virtual machine for malware.

In another embodiment, a computer system comprises a plurality of virtual machine images available for public access from a catalog of a public cloud computing environment. A validator virtual machine image is available for public access from the catalog. The validator virtual machine image is configured to be executed to boot a validator virtual machine, which is configured to boot a virtual machine from a virtual machine image in the plurality of virtual machine images and to scan the virtual machine for malware.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
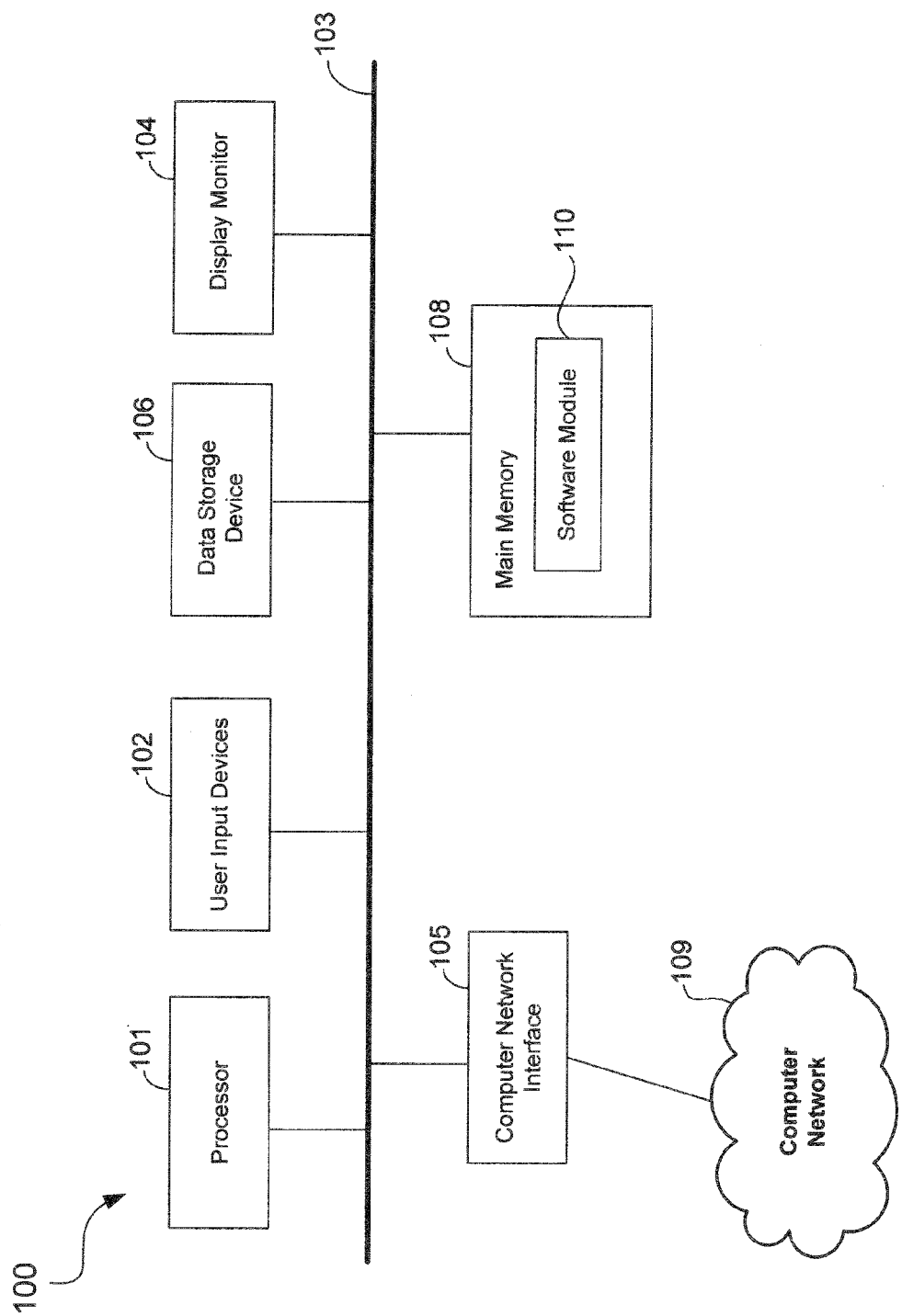
FIG. 1 shows a schematic diagram of a computer system in accordance with an embodiment of the present invention.

FIG. 1 shows a schematic diagram of a computer system 100 in accordance with an embodiment of the present invention. The computer system 100 may be a server computer configured as a host machine, for example. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer system 100 is a particular machine as programmed with software modules 110. The software modules 110 comprise computer-readable program code stored non-transitory in the main memory 108 for execution by a processor 101. The software modules 110 may be loaded from the data storage device 106 to the main memory 108. The software modules 110 may also be made available in other computer-readable medium including optical disk, flash drive, and other memory device.

In one embodiment, the computer system 100 is configured as a host machine for a plurality of virtual machines in a cloud computing environment. An end-user, referred to herein as a "customer", may use a client computer to connect to the computer system 100 over the Internet to access and use a virtual machine.

Figure 2:
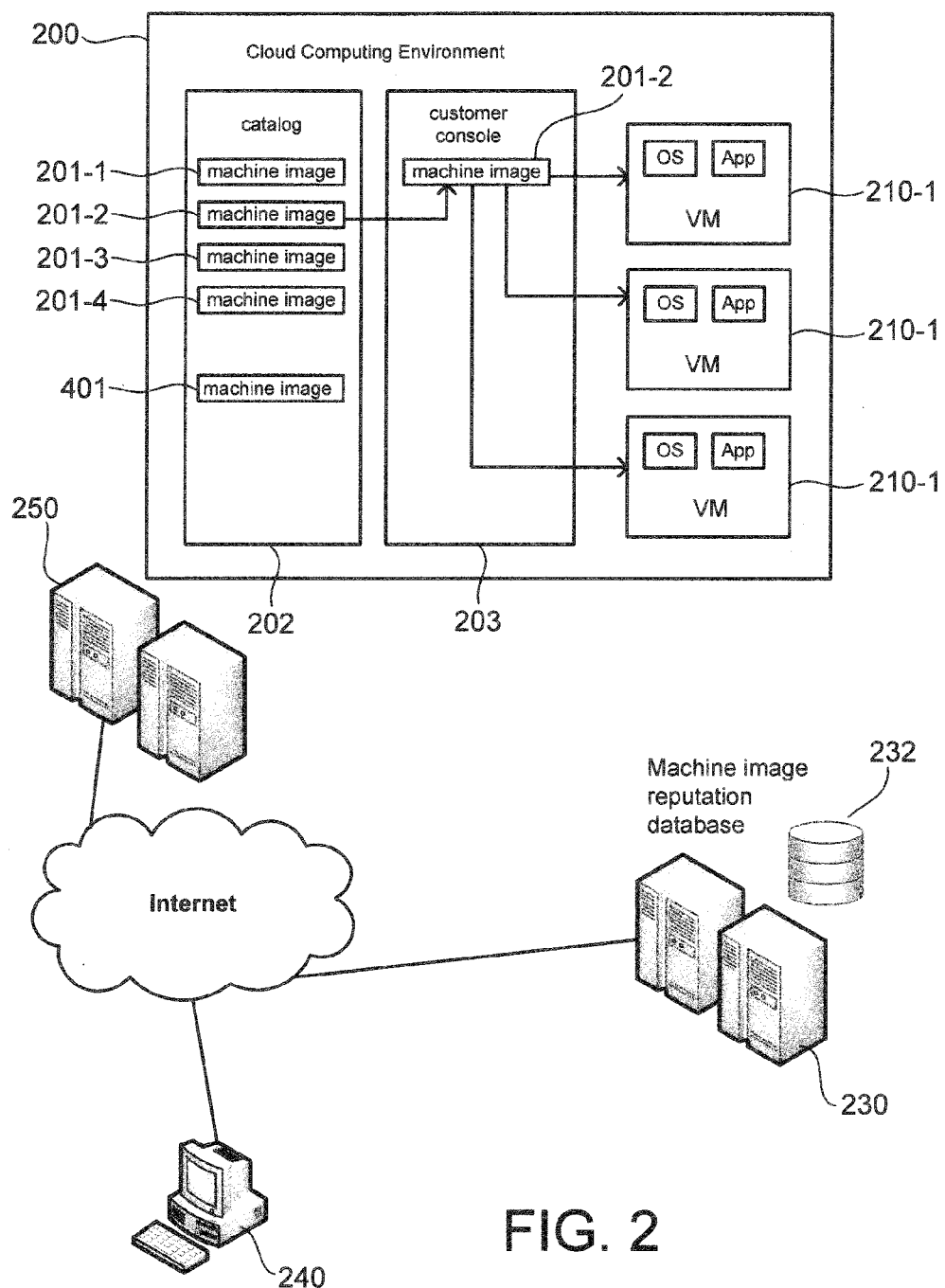
FIG. 2 schematically shows a cloud computing system in accordance with an embodiment of the present invention.

FIG. 2 schematically shows a public cloud computing system in accordance with an embodiment of the present invention. In the example of FIG. 2, the cloud computing system includes a computer system 250 and a client computer 240. In some embodiments, the cloud computing system includes a computer system 230 hosting a machine image reputation database 232. The machine image reputation database 232 may comprise a database or other listing of virtual machine images that are known to be good (i.e., safe) or known to be bad (e.g., infected with malware). A client computer 240 may connect to the computer system 230 to access the machine image reputation database 232 and find out if a particular virtual machine image is a known good or known bad machine image.

In the example of FIG. 2, the computer system 250 provides a hardware computing platform for a cloud computing environment 200. The computer system 250 and the cloud computing environment 200 form a cloud computing infrastructure, and may be maintained and operated by a public cloud service provider. As a particular example, embodiments of the present invention may be implemented on cloud computing platforms provided by the Amazon Web Services™.

The cloud computing environment 200 may provide service to many different, unrelated customers. The cloud computing environment may provide ready-built virtual machine images 201 (i.e., 201-1, 201-2, . . . 201-$n$). A virtual machine image 201 may comprise a data file that stores all information, including operating system, application programs, etc., required to boot (i.e., startup) one or more simultaneous and active virtual machines. A virtual machine image 201 may correspond to an Amazon Machine Image™ (AMI) offered to customers of the Amazon Web Services™, for example.

A customer may use a ready-build virtual machine image 201 from a catalog of virtual machine images 201 offered on the cloud computing environment 200. A virtual machine image 201 may offered for free, lease, or purchase, for example. A virtual machine image 201 listed in the catalog may be from the cloud service provider or from a third-party, such as another customer. When a customer selects to use a virtual machine image 201 from the catalog, that virtual machine image 201 becomes available in the customer's console. A console may comprise a shell or other interface to allow a customer to select and execute a virtual machine image to boot an instance, i.e., startup a virtual machine based on the virtual machine image. As can be appreciated, the virtual machine has the operating system, application programs, etc. of its corresponding virtual machine image. The virtual machine image selected from the catalog may appear as-is in the customer's console. The customer may also choose to install his own software as needed and re-package the virtual machine image as his own, modified virtual machine image.

The catalog may also list a virtual machine image 401. As will be more apparent below, the virtual machine image 401 is a validator virtual machine image in that it may be executed to boot a validator virtual machine for validating a virtual machine image 201.

In the example of FIG. 2, the customer purchased the virtual machine image 201-2 from the catalog of virtual machine images 201 available in the cloud computing environment. This results in the virtual machine image 201-2 being made available in the customer's console. The customer may select to execute the virtual machine image 201-2 to boot virtual machines 210-1. A virtual machine 210-1 may run an email server, database server, or other service or application. Generally speaking, a virtual machine image is in storage state, while an instance of the virtual machine image, i.e., its corresponding virtual machine, is in running state.

Figure 3:
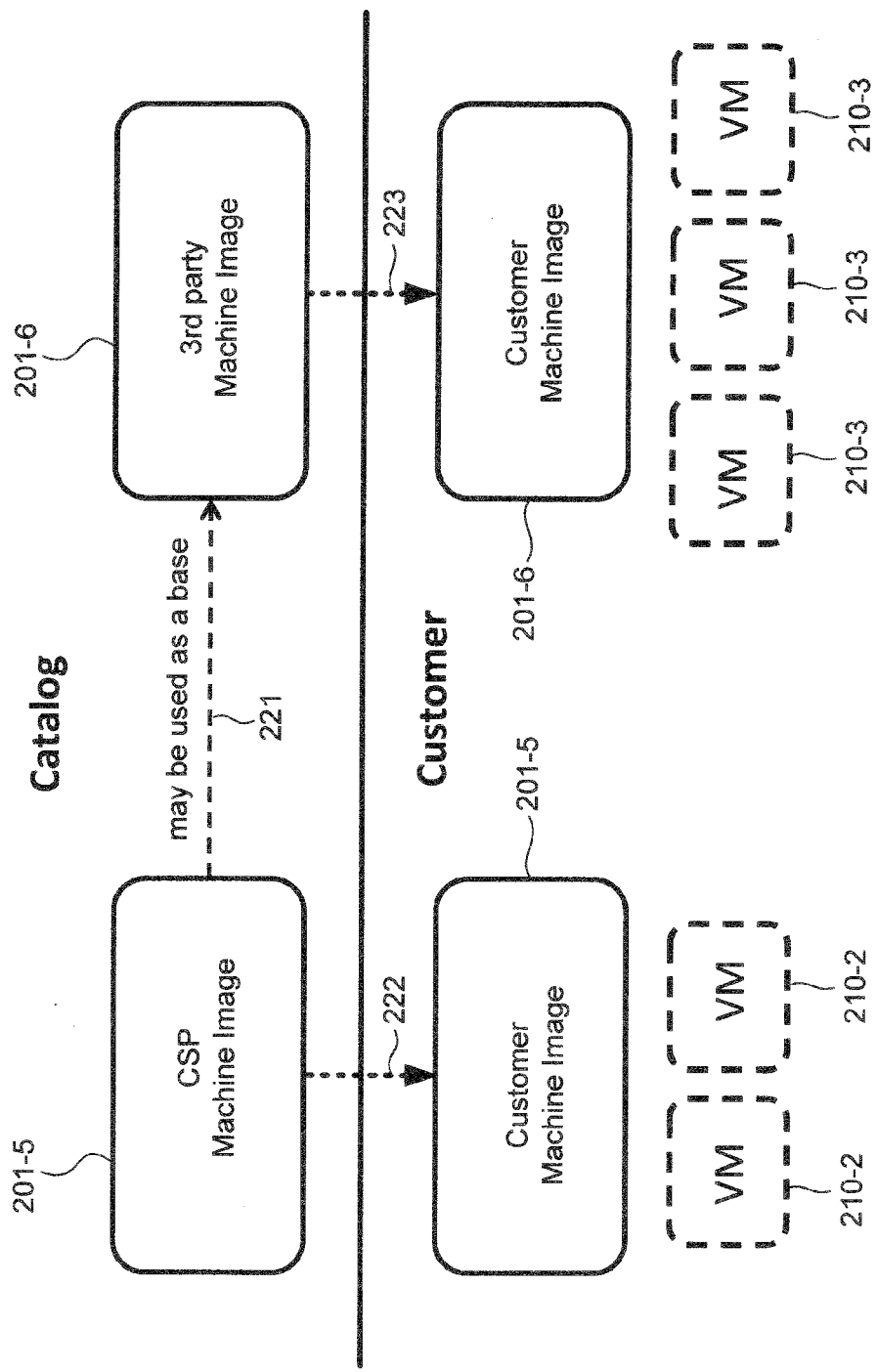
FIG. 3 schematically shows ready-built virtual machine images that may be available from the catalog of the cloud computing environment.

FIG. 3 schematically shows ready-built virtual machine images 201 that may be available from the catalog of the cloud computing environment 200. In the example of FIG. 3, the catalog may list a machine image 201-5 offered by the cloud service provider ("CSP Machine Image") and a machine image 201-6 offered by a third party ("3rd party Machine Image"), such as another customer. The machine image 201-6 may be based on the machine image 201-5 (arrow 221). For example, the machine image 201-6 may include the operating system and applications of the machine image 201-5 plus additional applications added by the third party. A customer may purchase both the machine image 201-5 (arrow 222) and the machine image 201-6 (arrow 223) to make them available in the customer's console. The machine image 201-5 may be executed from the customer's console to boot virtual machines 210-2. Similarly, the machine image 201-6 may be executed from the customer's console to boot virtual machines 210-3.

A virtual machine image may contain malware. For example, a virtual machine image 201 listed in the catalog may be infected with computer virus. In the case of a third party virtual machine image, such as machine image 201-6, the safety of the virtual machine image may be validated by provenance. That is, the safety of the virtual machine image may be validated by verifying the integrity of the build chain from the base machine image to the current machine image. As a particular example, the safety of the virtual machine image 201-6 may be validated by ensuring that it was created from the machine image 201-5, which is from the cloud service provider. The provenance approach necessarily assumes that the cloud service provider is trustworthy and that the third party selling the virtual machine image is itself trustworthy. However, meta-data provided at the virtual machine image level may be insufficient to verify the integrity of the build chain. Validating a virtual machine image by provenance is also hampered by the difficulty in mounting and reading a virtual machine image without instantiating a virtual machine off it.

A virtual machine image 201 from the cloud service provider itself may also be deemed safe by provenance. For example, the virtual machine image 201-5 may be validated by ensuring that it came from the cloud service provider. However, the same difficulties associated with relying on provenance remains, including insufficient meta-data information and limited inspection of a virtual machine image. In addition, the customer may install additional applications in a virtual machine and save the virtual machine as a virtual machine image. The newly saved virtual machine image may no longer be safe because of the added applications.

Figure 4:
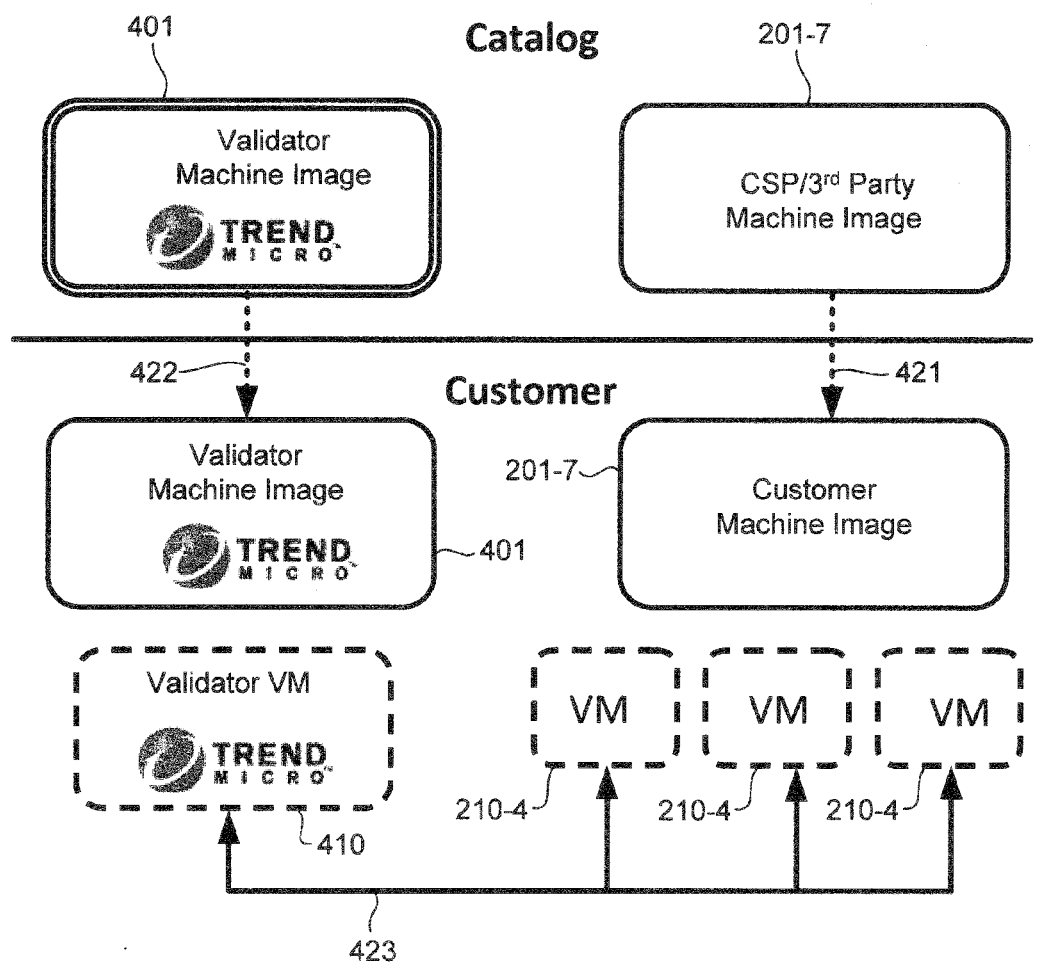
FIG. 4 schematically shows a validator machine image in a cloud computing environment in accordance with an embodiment of the present invention.

FIG. 4 schematically shows a validator machine image 401 in a cloud computing environment in accordance with an embodiment of the present invention. The validator machine image 401 may be offered to customers by listing the validator machine image 401 in the catalog of the cloud computing environment 200, similar to the pre-built virtual machine images 201. The validator machine image 401 may be from a third party, such as a computer security vendor. In the example of FIG. 4, the validator machine image 401 is offered by Trend Micro Inc. The validator machine image 401 may also be offered by other third parties or even by the cloud service provider. The validator machine image 401 may be offered to customers for purchase, for leasing, on a pay-per use basis, or some other payment plan.

The validator machine image 401 may comprise computer-readable program code for validating a virtual machine image 201. In one embodiment, the validator machine image 401 is configured to be executed from a customer console to boot a validator virtual machine 410. The validator virtual machine 410 may be configured to validate a target virtual machine image by booting a target virtual machine off the target virtual machine image, examining the target virtual machine for presence of malware, and validating the target virtual machine image based on the results of the examination. Unlike traditional security solutions that continuously run in the virtual machine, the validator virtual machine image 401 may be executed on an as needed basis. For example, the customer may execute the validator virtual machine image 401 only when a new virtual machine image 201 is received, and after the virtual machine image 201 is modified (e.g., by adding applications). This saves on processing costs, which in a cloud computing environment can add up because cloud service providers typically charge by CPU and storage usage.

In the example of FIG. 4, the customer purchased a machine image 201-7 from the catalog of the cloud computing environment 200 (arrow 421). The machine image 201-7 may be from the customer service provider or a third party. To validate the machine image 201-7, the customer also selected the validator machine image 401 from the catalog of the cloud computing environment 200 (arrow 422) on a pay-per-use basis or outright purchase, for example. The customer selects the validator machine image 401 from the customer's console for execution, creating an instance of a validator virtual machine 410 in the customer's user space, which in this example includes virtual machine images accessible from the customer's console. The validator virtual machine 410 may include a user interface for receiving instructions from the customer, including a way of indicating which of the customer's machine images 201 is to be validated. In the example of FIG. 4, the customer's machine image 201-7 has been selected for validation to determine whether or not the machine image 201-7 is safe to use. The validator virtual machine 410 boots one or more virtual machines 210-4 from the customer machine image 201-7. Thereafter, the validator virtual machine 410 validates the customer's virtual machine image 201-7 by examining at least one virtual machine 210-4 for malware, including computer viruses, and other potential threats (arrow 423). The validator virtual machine 410 may provide a report of the validation, indicating whether the customer's machine image 201-7 is safe, bad, or in an unknown state based on the result of examining the virtual machine 210-4. The report may be presented on a display monitor, in a log, as an email alert, or in other ways of presenting or sending a report.

Figure 5:
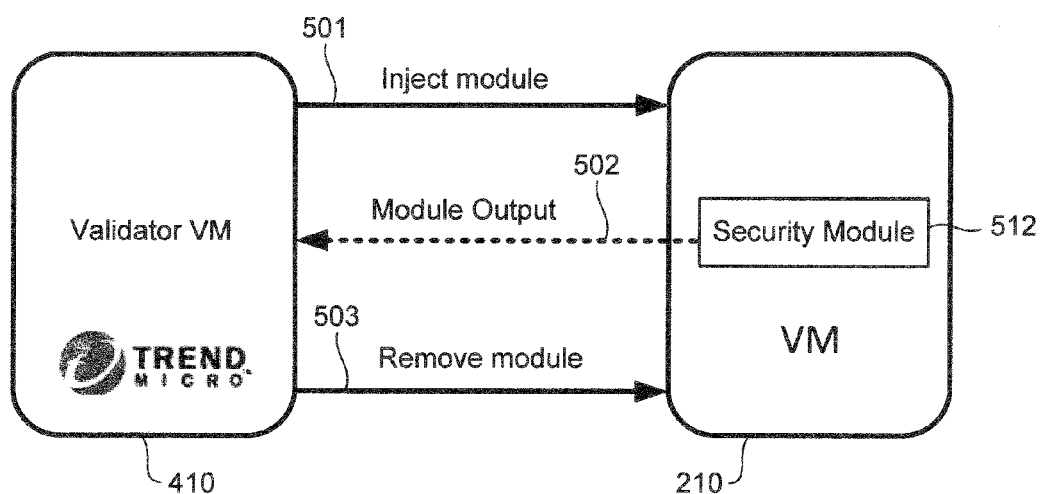
FIG. 5 schematically illustrates the operation of the validator virtual machine of FIG. 4 in accordance with an embodiment of the present invention.

FIG. 5 schematically illustrates the operation of the validator virtual machine 410 in accordance with an embodiment of the present invention. The virtual machine 410 may communicate and interact with other virtual machines using an application programming interface, for example. To examine a virtual machine 210 for malware, the validator virtual machine 410 may inject a security module 512 into the virtual machine 210 (arrow 501). The security module 512 may comprise computer-readable program code for checking a virtual machine 210 for malware. The security module 512 may employ suitable anti-malware algorithms, such as pattern matching, heuristics, and other algorithms for detecting malware. For example, the security module 512 may scan files of the virtual machine 210 for computer viruses. Upon injection into the virtual machine 210, the security module 512 examines the virtual machine 210 for malware, and reports the results of the examination to the validator virtual machine 410 (arrow 502). The validator virtual machine 410 removes the security module 512 from the virtual machine 210 after examining the virtual machine 210 for malware (arrow 503). For example, the validator virtual machine 410 may issue an instruction to the security module 512 to terminate itself or request the virtual machine 210 to terminate the security module 512. The security module 512 may also be configured to automatically self-terminate upon completing examination of the virtual machine 210 for malware.

Figure 6:
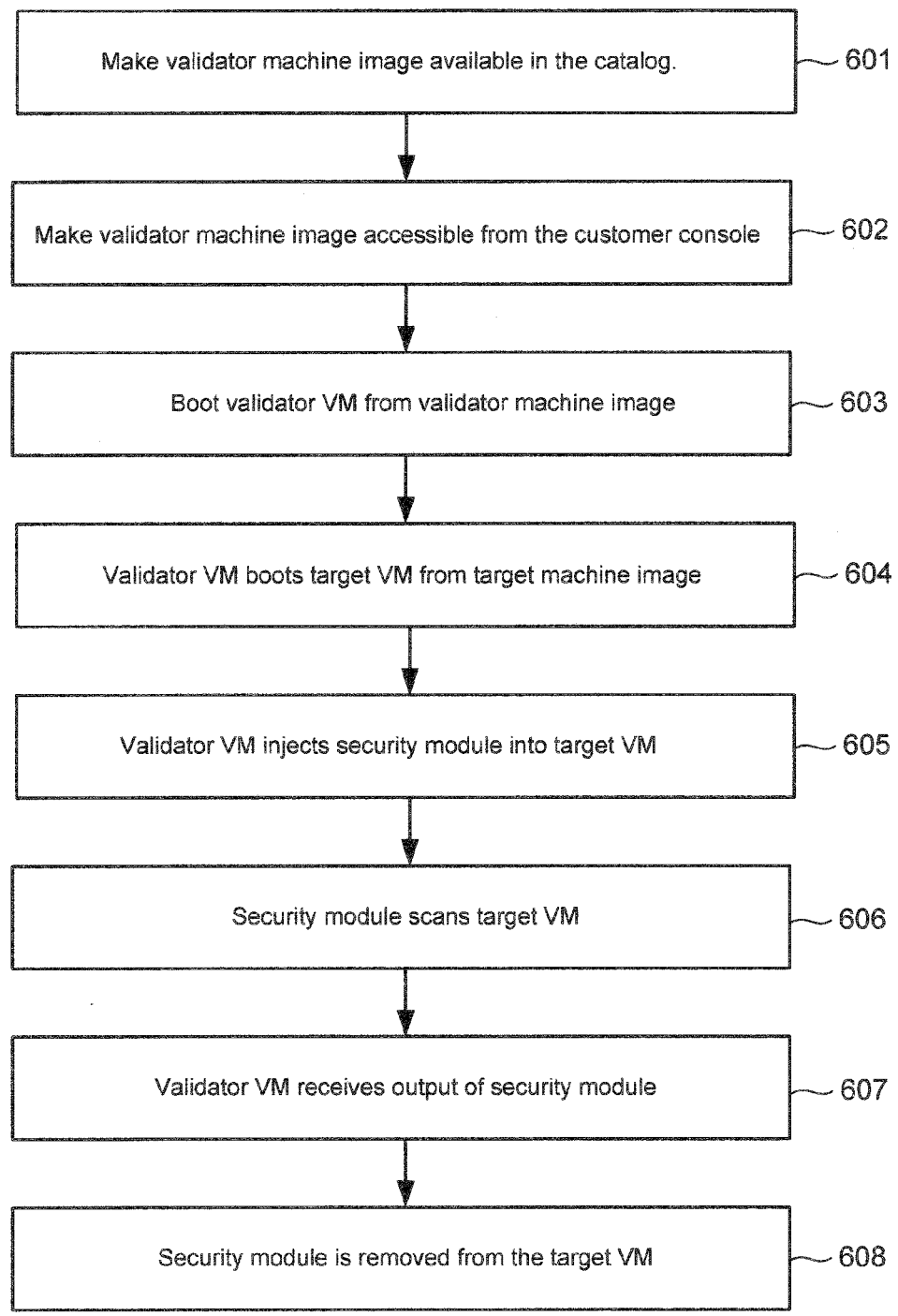
FIG. 6 shows a flow diagram of a method of certifying a virtual machine image in a cloud computing environment in accordance with an embodiment of the present invention.

FIG. 6 shows a flow diagram of a method of certifying a virtual machine image in a cloud computing environment in accordance with an embodiment of the present invention. The method of FIG. 6 is explained using previously discussed components for clarity of illustration. Other components may also be used without detracting from the merits of the present invention. The steps of the method of FIG. 6 may be automated using a script or other computer-readable program code for coordinating program execution, for example.

In the example of FIG. 6, the validator machine image 401 is made available in the catalog of the cloud computing environment 200 (step 601). For example, the validator machine image 401 may be made available to customers by listing it along with other virtual machine images 201 in the catalog. The validator machine image 401 is made accessible from the console of a customer who decided to use the validator machine image 401. The customer may lease, pay-per-use, rent, or purchase the validator machine image 401, for example. The validator machine image 401 may be moved to the customer console by providing a pointer to or a copy of the validator machine image 401, for example.

The customer selects the validator machine image 401 from the console for execution. This results in the booting of a validator virtual machine 410 off the validator virtual machine image 401 (step 603). The validator virtual machine 410 boots a virtual machine 210-4 (step 604), which is the target virtual machine in this example, off the virtual machine image 201-7. The validator virtual machine 410 injects the security module 512 into the virtual machine 210-4 (step 605). The security module 512 examines the virtual machine 210-4 for malware, e.g., by scanning the virtual machine 210-4 for computer viruses (step 606). The security module 512 sends its output, which in this case is the results of the examination, to the validator virtual machine 410 (step 607). The validator virtual machine 410 may generate a report of the results. The report may indicate that the virtual machine image 201-7 is safe, bad, or in an unknown state, depending on the results of the examination of the virtual machine 210-4. For example, the virtual machine image 201-7 may be reported as bad when the virtual machine 210-4 is found infected with malware. As another example, the virtual machine image 201-7 may be reported as safe when the virtual machine 210-4 is found to be clean and safe to use. The virtual machine image 201-7 may be reported as in an unknown state when the security module 512 cannot complete its evaluation of the virtual machine 210-4. The security module 512 is removed from the virtual machine 210-4 upon completion of the evaluation (step 608).

A typical process of creating a virtual machine image involves preparing the base image with the operating system, installing the requisite applications in the virtual machine image, packaging the virtual machine image, and submitting and registering the virtual machine image for public use. A customer that uses the virtual machine image creates an instance of a virtual machine from the virtual machine image. However, as previously mentioned, the customer typically has no way of verifying that that the virtual machine image, and hence its virtual machines, is safe. In another aspect of the present disclosure, a virtual machine image is certified by incorporating the certification process in the preparation of the virtual machine image for public offering. This aspect of the present disclosure is now explained beginning with FIG. 7.

Figure 7:
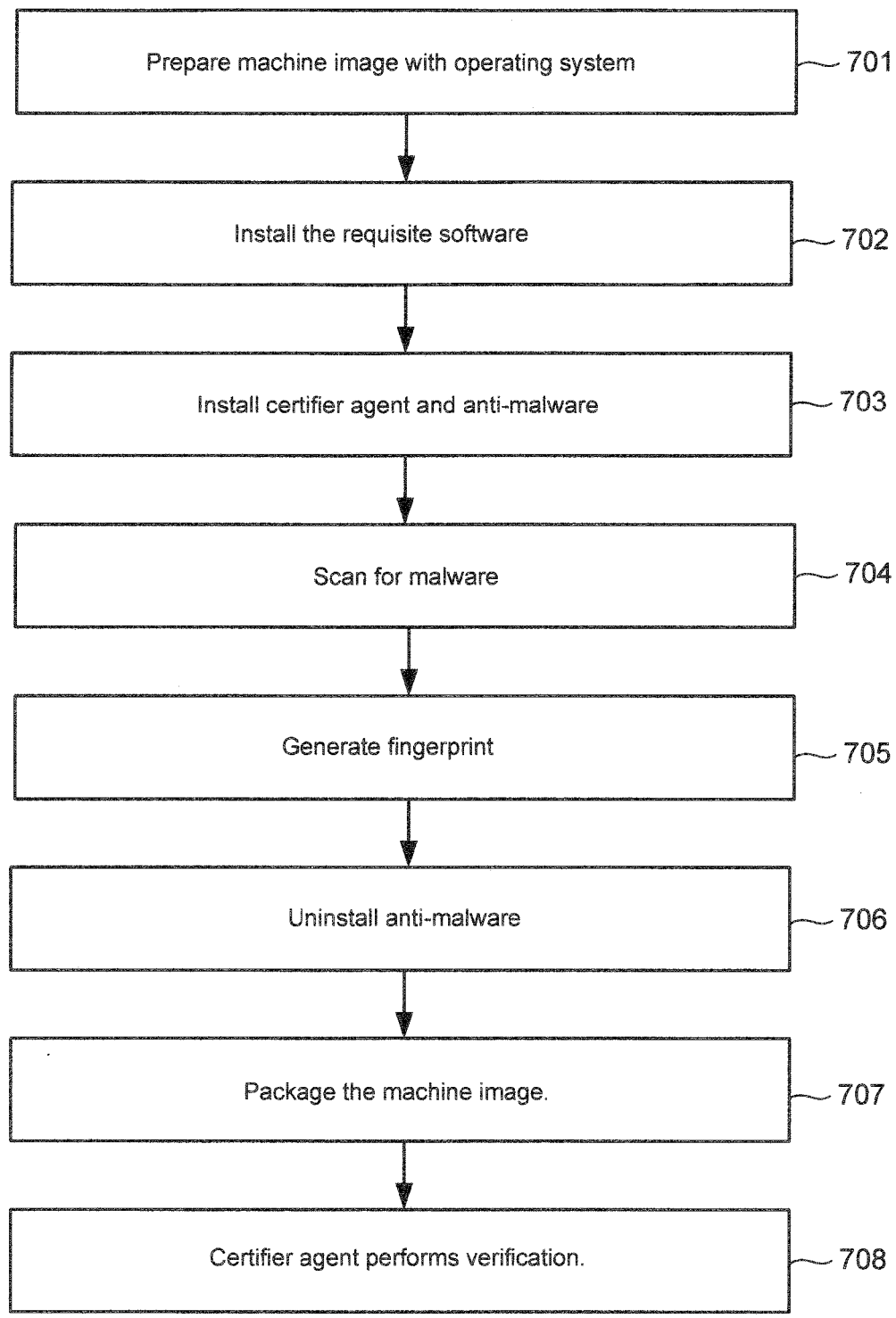
FIG. 7 shows a flow diagram of a method of certifying a virtual machine image in a cloud computing environment in accordance with an embodiment of the present invention.

FIG. 7 shows a flow diagram of a method of certifying a virtual machine image in a cloud computing environment in accordance with an embodiment of the present invention. FIG. 7 is explained together with FIG. 8, which schematically illustrates some steps of the method of FIG. 7. The steps of the method of FIG. 7 may be automated using a script or other computer-readable program code for coordinating program execution, for example.

Figure 8:
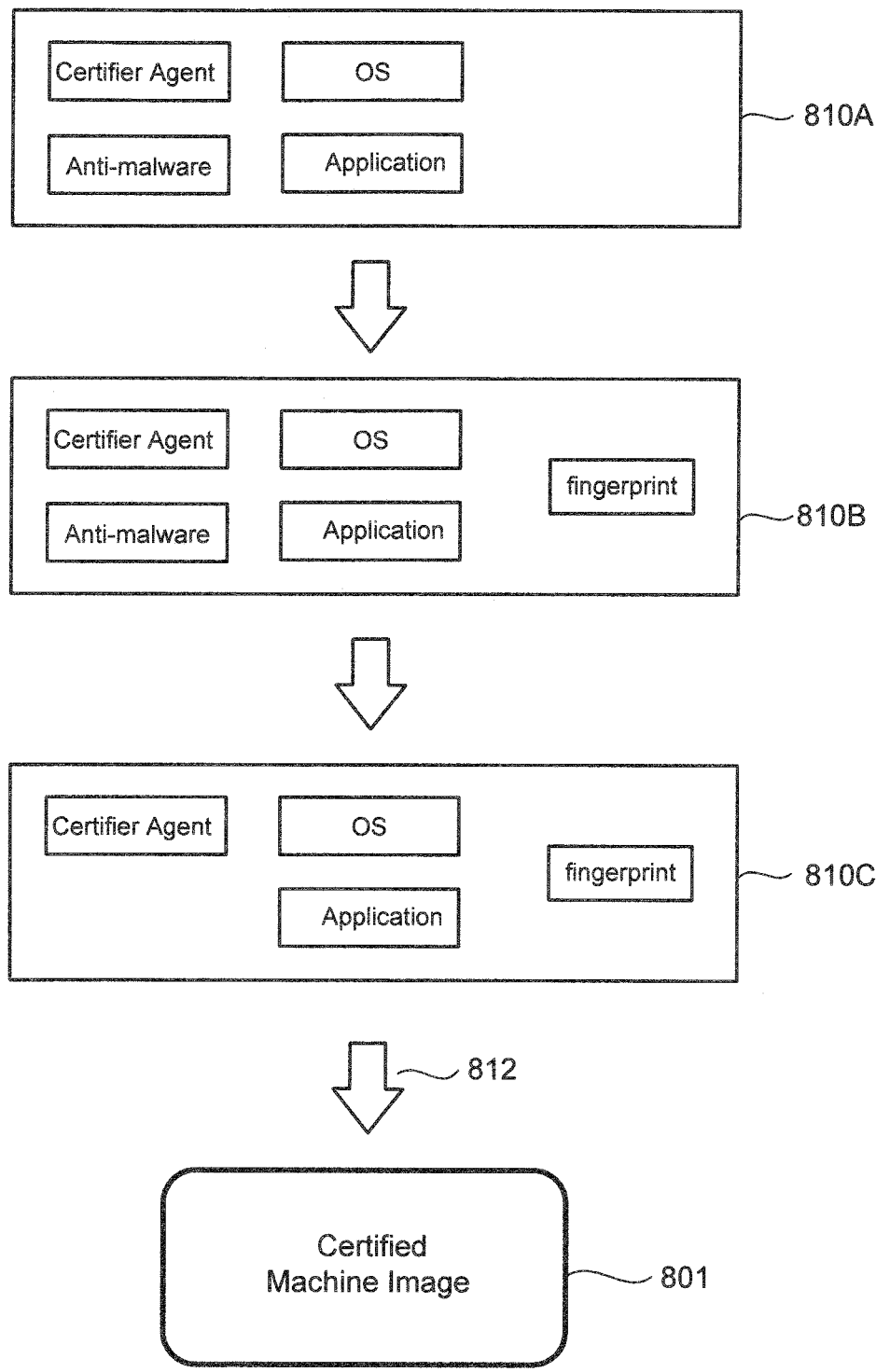
FIG. 8 schematically illustrates some steps of the method of FIG. 7, in accordance with an embodiment of the present invention.

In the example of FIG. 7, a virtual machine image is prepared with its operating system (step 701). A "bare bones" or "base" virtual machine image with an operating system may be made available by the cloud service provider or vendor of the cloud computing platform. The virtual machine image is executed to boot a corresponding virtual machine. Requisite software, such as applications, servers, and the like, are installed in the virtual machine (step 702). A certifier agent and an anti-malware are also installed in the virtual machine (step 703). The just described steps are also illustrated in FIG. 8, where applications, an anti-malware, and a certifier agent are installed in a virtual machine 810 with operating system (see "810A").

The anti-malware may comprise computer-readable program code for examining a virtual machine image for malware. The anti-malware may employ suitable anti-malware algorithms, such as pattern matching, without detracting from the merits of the present invention. In one embodiment, the anti-malware is configured to scan the components of a virtual machine for malware, including computer viruses. The anti-malware may include a pattern file comprising patterns of known malware. To detect malware, the anti-malware may compare contents of files and other components of the virtual machine to patterns in the pattern file.

The certifier agent may comprise computer-readable program code for certifying a virtual machine image. In one embodiment, the certifier agent is configured to generate a fingerprint of a virtual machine that is deemed free of malware. The fingerprint may be based on scan-time, pattern file used to scan the virtual machine for malware, other potentially unique aspects of the virtual machine. The certifier agent may encrypt the fingerprint, and store the fingerprint in a predetermined location in the virtual machine.

The anti-malware is executed to scan the virtual machine for malware (step 704). When the virtual machine is found to be safe (e.g., free of malware), the certifier agent generates a fingerprint of the virtual machine (step 705). These steps are also illustrated in FIG. 8, where the certifier agent generates a fingerprint of the virtual machine 801 (see "810B") found to be free of malware. The certifier agent may encrypt the fingerprint and store it in a predetermined location in the virtual machine 801. This fingerprint, also referred to as "original fingerprint," may be compared to a new, recomputed fingerprint to detect modification or tampering of the virtual machine, and hence its corresponding virtual machine image.

The anti-malware is uninstalled from the virtual machine after scanning the virtual machine for malware (step 706). This is shown in FIG. 8, where the anti-malware is removed from the virtual machine 801 (see "810C"). The virtual machine is then saved as a virtual machine image in a process also referred to as "packaging." The packaging of the virtual machine image is illustrated in FIG. 8, where the virtual machine 801 is saved as a certified virtual machine (see arrow 812). The virtual machine image may then be registered and submitted to be included in the catalog of the cloud computing environment. The virtual machine image may be published in the catalog as being certified to make the virtual machine image more desirable to potential customers. For example, the virtual machine image may be published as "Trend-Certified" to indicate that the virtual machine image has been certified by Trend Micro Inc. to be free of malware.

When the virtual machine 810 is booted off the virtual machine image 801 from a customer console, the certifier agent automatically runs and verifies that the virtual machine image 801 has not been modified or tampered with (step 708). For example, the certifier agent may verify that the virtual machine 810 booted off the virtual machine image 801 is in the same condition as when the virtual machine 810 was scanned for malware, found to be free of malware, and then fingerprinted. To verify the virtual machine image 801, the certifier agent may re-compute the fingerprint of the virtual machine 810 to generate a recomputed fingerprint, retrieve and decrypt the original fingerprint, and compare the recomputed fingerprint to the original fingerprint to verify that that the virtual machine image 801 is in its certified condition. If the recomputed fingerprint is not the same as the original fingerprint, the virtual machine image 801 has somehow been modified since it was packaged by its source. As can be appreciated, the just described certification process gives customers a measure of confidence when getting a virtual machine image from a public source, such as a catalog of a public cloud computing environment shared by many different entities.

In another aspect of the present disclosure, reputation of virtual machine images may be stored and maintained in a reputation database and offered to customers by way of a portal. As a particular example, a reputable computer security vendor may evaluate popular virtual machine images for safety, e.g., by scanning for malware. The result of the evaluation, such as whether a virtual machine image is safe, bad, or in an unknown state, may be stored in a virtual machine image reputation database 232 (see FIG. 2). A hash, or other unique identifier, of a virtual machine image may be generated and stored along with the virtual machine image's reputation to uniquely identify the virtual machine image. A customer client computer 240 may connect to the computer system 230, which serves as the portal, to get a reputation of a virtual machine image.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of certifying a virtual machine image in a cloud computing environment, the method comprising:
   installing an anti-malware in a virtual machine;
   using the anti-malware to scan the virtual machine for presence of malware;
   finding that the virtual machine is free of malware;
   in response to finding that the virtual machine is free of malware, removing the anti-malware from the virtual machine and generating an original fingerprint of the virtual machine;
   storing the original fingerprint in the virtual machine;
   saving the virtual machine as a virtual machine image after removing the anti-malware from the virtual machine and storing the original fingerprint in the virtual machine; and
   listing the virtual machine image in a catalog of a public cloud computing environment.

2. The method of claim 1 further comprising:
   after listing the virtual machine image in the catalog:
   a) booting the virtual machine from the virtual machine image,
   b) re-computing a new fingerprint of the virtual machine, and
   c) verifying that the virtual machine image is in a certified condition by comparing the new fingerprint to the original fingerprint.

3. The method of claim 2 wherein the original fingerprint is encrypted as stored in the virtual machine.

4. The method of claim 2 wherein booting the virtual machine from the virtual machine image comprises executing the virtual machine image from a customer console.

5. A method of certifying a virtual machine image in a cloud computing environment, the method comprising:
   booting a validator virtual machine from a validator virtual machine image;
   the validator virtual machine booting a target virtual machine from a target virtual machine image;
   the validator virtual machine injecting a security module into the target virtual machine;
   the security module scanning the target virtual machine for malware; and
   removing the security module from the target virtual machine after scanning the target virtual machine for malware.

6. The method of claim 5 wherein the security module scans the target virtual machine for computer viruses.

7. The method of claim 5 wherein the security module sends a result of scanning the target virtual machine for malware to the security module before the security module is removed from the target virtual machine.

8. The method of claim 5 wherein the validator virtual machine image is listed in a catalog of a public cloud computing environment along with other publicly accessible virtual machine images.

9. The method of claim 8 wherein the validator virtual machine image is executed from a customer console.

10. The method of claim 5 wherein the validator virtual machine does not run continuously.

11. The method of claim 10 wherein the validator virtual machine image is executed only when a new virtual machine image is made available in a customer console.

12. The method of claim 5 wherein the security module is configured to automatically self-terminate after scanning the target virtual machine for malware.

13. A computer system comprising:
   one or more computers that provide (a) a plurality of virtual machine images available for public access from a catalog of a public cloud computing environment and (b) a validator virtual machine image available for public access from the catalog, the validator virtual machine image being configured to be executed by the one or more computers to boot a validator virtual machine, the validator virtual machine being configured to boot a virtual machine from a virtual machine image in the plurality of virtual machine images, and to inject a security module into the virtual machine, to scan the virtual machine for malware, and to remove the security module from the virtual machine after scanning the virtual machine for malware.

14. The computer system of claim 13 wherein the security module is configured to automatically self-terminate after scanning the virtual machine for malware.

15. The computer system of claim 13 wherein the security module scans the virtual machine for computer viruses.

* * * * *